US012734716B2

(12) United States Patent
Shi et al.

(10) Patent No.: US 12,734,716 B2
(45) Date of Patent: Sep. 15, 2026

(54) QUADRUPED ROBOT AND SPINE-LEG-FOOT COUPLING DRIVING METHOD

(71) Applicant: BEIJING INSTITUTE OF TECHNOLOGY, Beijing (CN)

(72) Inventors: Qing Shi, Beijing (CN); Ruochao Wang, Beijing (CN); Hang Xiao, Beijing (CN); Rongjie Du, Beijing (CN); Xiaolong Quan, Beijing (CN); Junhui Gao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 614 days.

(21) Appl. No.: 18/222,376

(22) Filed: Jul. 14, 2023

(65) Prior Publication Data

US 2024/0335960 A1 Oct. 10, 2024

(30) Foreign Application Priority Data

Apr. 10, 2023 (CN) ......................... 202310375889.0

(51) Int. Cl.
*B25J 17/00* (2006.01)
*B25J 9/00* (2006.01)
*B62D 21/18* (2006.01)
*B62D 57/032* (2006.01)

(52) U.S. Cl.
CPC ............. *B25J 17/00* (2013.01); *B25J 9/0009* (2013.01); *B62D 21/18* (2013.01); *B62D 57/032* (2013.01)

(58) Field of Classification Search
CPC ......... B25J 17/00; B25J 9/0009; B62D 21/18; B62D 57/032; B62D 57/02; Y02A 50/30
See application file for complete search history.

(56) References Cited

U.S. PATENT DOCUMENTS 9,387,896 B1 * 7/2016 Blankespoor ........ B62D 57/032
9,731,416 B1 * 8/2017 Saunders .................. B25J 9/14
2018/0172121 A1 * 6/2018 Potter .................. B62D 57/032
2022/0144358 A1 * 5/2022 Hurst ........................ F16F 3/12
2023/0381964 A1 * 11/2023 Wang ..................... B25J 9/1664

FOREIGN PATENT DOCUMENTS

CN 109940586 A 6/2019

* cited by examiner

*Primary Examiner* — Valentin Neacsu
*Assistant Examiner* — Marlon A Arce
(74) *Attorney, Agent, or Firm* — Maschoff Brennan

(57) ABSTRACT

Provided are a quadruped robot and a spine-leg-foot coupling driving method, relating to the technical field of bionic robots. The quadruped robot includes an active spine, and two trunks. The two trunks are a fore trunk and a hind trunk, respectively. The two trunks can pitch and can be telescopically arranged at both ends of the active spine in a front-rear direction. The active spine can drive the trunks to pitch, extend and retract. In accordance with the spine-leg-foot coupling driving method, the pitch and retraction state of the spine and the energy storage and release state of legs during the running of a quadruped are stimulated by controlling the swing state of a swing output member, the extension and retraction state of the trunk and the energy storage and release state of an elastic leg.

11 Claims, 6 Drawing Sheets

QUADRUPED ROBOT AND SPINE-LEG-FOOT COUPLING DRIVING METHOD

CROSS-REFERENCE TO RELATED APPLICATION

This patent application claims the benefit and priority of Chinese Patent Application No. 2023103758890, filed with the China National Intellectual Property Administration on Apr. 10, 2023, the disclosure of which is incorporated by reference herein in its entirety as part of the present application.

TECHNICAL FIELD

The present disclosure relates to the technical field of bionic robots, in particular to a quadruped robot and a spine-leg-foot coupling driving method.

BACKGROUND

Quadruped robots are widely used in field detection, complex scene inspection and other fields because they can flexibly plan their foothold support points and can provide better environmental adaptability than wheeled or tracked robots.

Quadrupeds in nature have excellent running and jumping ability, which is attributed to the coordination and matching of muscles and bones and joints in their whole body, especially the dynamic coordination and matching of spine and legs. However, the spine of the existing quadruped robot is usually stiff spine or passive spine, and does not have the basic movements of the animal spine, such as pitching, extension and retraction, which makes the quadruped robot have some problems such as stiff and decreased flexibility due to the lack of active spine movement during actual operation, and in turn limits the improvement of the movement speed, energy efficiency and other key indicators of the quadruped robot.

The existing spine is a multi-joint spine disclosed in a multi-joint spine and a spine-type quadruped robot (CN109940586A) invented by Harbin Institute of Technology, including a first backbone, a second backbone and a third backbone which are hinged in turn, where the first spine and the third spine are respectively used for mounting lower trunks of a robot, the first backbone is connected with a first drive unit for driving the first backbone to rotate around a hinge shaft, the third backbone is connected with a second drive unit for driving the third backbone to rotate around a hinge shaft, and the first drive unit and the second drive unit are respectively mounted on the second backbone.

However, such a quadruped robot only has the function of pitching, the problem that the quadruped is accompanied by the expansion and retraction of spine when jumping is not disclosed in the prior art. Based on this, a new scheme is urgently needed to solve the above problems.

SUMMARY

An objective of the present disclosure is to provide a quadruped robot and a spine-foot-leg coupling method to solve the problems in the prior art. Therefore, a running posture of a quadruped can be simulated more realistically, and the moving speed and energy efficiency are improved.

In order to achieve the above objective, the present disclosure provides the following solution:

A quadruped robot is provided in accordance with the present disclosure. The quadruped robot includes an active spine and two trunks. The two trunks are a fore trunk and a hind trunk, respectively. The two trunks can pitch and can be telescopically arranged on both ends of the active spine in a front-back direction, and the active spine can drive the trunks to pitch, extend and retract.

Preferably, the active spine includes a spine mounting frame, two swing output members and a pitching drive motor. The two swing output members can be mounted on a front end and a rear end of the spine mounting frame in a pitching manner, the trunks are movably arranged on the swing output members in directions away from and close to the swing output members, and the pitching drive motor is fixedly arranged in the spine mounting frame and can drive the swing output members to pitch. The swing output members can drive the trunks to pitch.

Preferably, a middle part of each swing output member is hinged to the spine mounting frame to form a fixed revolving pair. A sliding chute is provided on the spine mounting frame, and the swing output member forms a movable revolving pair with the sliding chute through a sliding shaft. The swing output member reaches a limit pitching angle when the sliding shaft is moved to an end part of the sliding chute. The pitching drive motor can drive the sliding shaft to move in the sliding chute to achieve the pitching of the swing output member.

Preferably, spine drive wheels are fixedly arranged on output shafts of the pitching drive motor, and a mounting part is eccentrically arranged on each spine drive wheel. The pitching drive motor is used to drive the two swing output members to pitch through a first multi-link mechanism and a second multi-link mechanism. One end of the first multi-link mechanism and one end of the second multi-link mechanism are both fixedly connected to the mounting parts, and the other ends of the first multi-link mechanism and the second multi-link mechanism are respectively hinged to two sliding shafts. The first multi-link mechanism and the second multi-link mechanism are symmetrical about a point center, and the pitching drive motor drives the spine drive wheels to rotate unidirectionally to achieve reciprocating swing of the swing output members. The first multi-link mechanism and the second multi-link mechanism each are a two-link mechanism, two links in the two-link mechanism are connected by a three-rod connecting shaft, a crank rod is also hinged on the three-rod connecting shaft, and one end, away from the three-rod connecting shaft, of the crank rod is hinged with the spine mounting frame.

Preferably, a structure of the spine mounting frame is planar symmetrical about a first plane, and the first plane is a central plane in a width direction of the spine mounting frame. The pitching drive motor is a double-shaft drive motor, which is mounted in the middle of the spine mounting frame, and two output shafts of the pitching drive motor are fixedly connected to the spine drive wheels on both sides of the spine mounting frame.

Preferably, the active spine further includes two extension and retraction drive motors, which respectively correspond to the two trunks. The extension and retraction drive motor is fixedly arranged on the swing output member or an end part of the spine mounting frame. The trunk is provided with a threaded hole, a lead screw is connected to an output shaft of the extension and retraction drive motor, and the lead screw is threaded to the threaded hole, thus the extension and retraction drive motor is used to drive the lead screw to rotate towards different directions to extend and retract the trunk.

When the extension and retraction drive motor is fixedly arranged at the end part of the spine mounting frame, an output shaft of the extension and retraction drive motor is in transmission connection with the lead screw through a universal joint.

Preferably, multiple elastic legs are provided below each trunk. The active spine includes an elastic leg retraction drive device, which can drive the elastic leg to compress for energy storage, and can terminate a compressed state to enable the elastic leg to bounce.

Preferably, the elastic leg retraction drive device comprises pull cords, a winding reel and a lead screw. The two pull cords are wound around the winding reel, and the two pull cords correspond to the two elastic legs. A free end of the pull cord is fixedly connected to a tail end of the elastic leg. The winding reel is coaxially mounted at a tail end of the lead screw. When the extension and retraction drive motor drives the lead screw to rotate, the winding reel is driven to rotate forward and backward. A guide pulley is arranged on the trunk to guide the pull cords.

Preferably, the trunk includes a trunk mounting frame, two elastic leg swing drive motors, two drive cranks, and two elastic leg rotating shafts. Two slideways are provided on the trunk mounting frame, and two columnar sliding columns are arranged on the swing output member. The sliding column forms a moving pair with the slideway. The two elastic leg swing drive motors are arranged on both sides inside the trunk mounting frame. A working space for the winding reel is reserved between the two elastic leg swing drive motors. The elastic leg rotating shaft is fixedly mounted on the lower side of the trunk mounting frame, the elastic leg is rotatably connected to the elastic leg rotating shaft. An output shaft of the elastic leg swing drive motor is fixedly connected to a first end of the drive crank, a cylinder protruding from a second end of the drive crank forms a moving revolving pair with the sliding chute on the upper side of the elastic leg, and the drive crank rotate unidirectionally to make the elastic leg periodically reciprocate around the elastic leg rotating shaft.

A spine-leg-foot coupling driving method of the quadruped robot above is further provided in accordance with the present disclosure. The method includes the following steps:

- providing multiple elastic legs below each trunk of a quadruped robot, where an active spine includes an elastic leg retraction drive device, which can drive the elastic leg to compress for energy storage, and can terminate a compressed state to enable the elastic leg to bounce; and
- simulating pitch and retraction states of a spine and an energy storage and release state of the trunk during the running of a quadruped by controlling a swing state of a swing output member, an expansion and retraction state of the trunk and an energy storage and release state of the elastic leg.

Compared with the prior art, the present disclosure has the following technical effects:

The scheme provided by the present disclosure can pitch, extend and retract, so as to simulate a running posture of a quadruped more realistically and in turn to improve the moving speed and energy efficiency.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
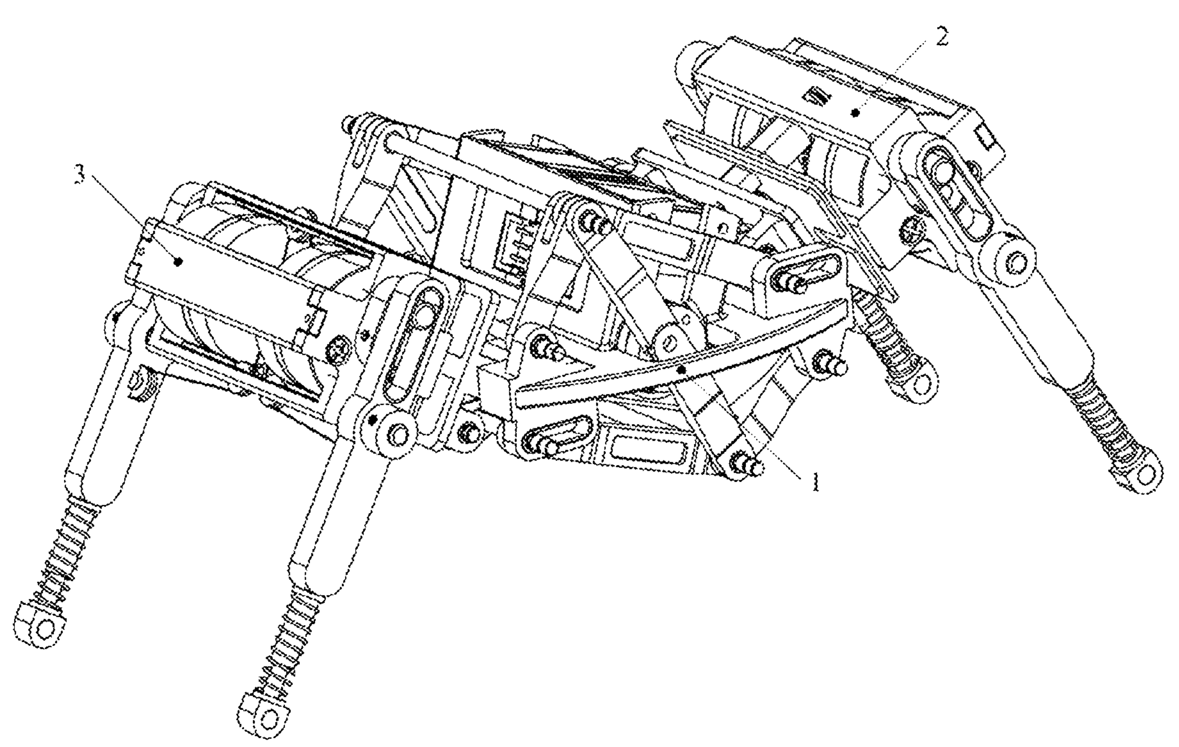
FIG. 1 is a structure schematic diagram of a quadruped robot according to an embodiment 1.

In the drawings: 1—active spine, 2—fore trunk, 3—hind trunk, 101—spine mounting frame; 102—spine drive wheel; 103—drive rod; 104—crank rod; 105—three-rod connecting shaft; 106—link; 107—sliding shaft; 108—short rod; 109—short rod shaft; 110—universal joint; 111—swing output member; 112—lead screw; 113—winding reel; 114—crank rod shaft; 115—pitching drive motor; 116—two-link mechanism; 201—trunk mounting frame; 202—drive crank; 203—elastic leg; 204—lead screw nut; 205—elastic leg rotating shaft; 206—slideway; 207—guide pulley; 212—right pull cord; 213—left pull cord.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a quadruped robot and a spine-leg-foot coupling method to solve the problems in the prior art. Therefore, a running posture of a quadruped can be simulated more realistically, and the moving speed and energy efficiency are improved.

To make the objectives, features and advantages of the present disclosure more apparently and understandably, the following further describes the present disclosure in detail with reference to the accompanying drawings and the specific embodiments.

Embodiment 1

Figure 2:
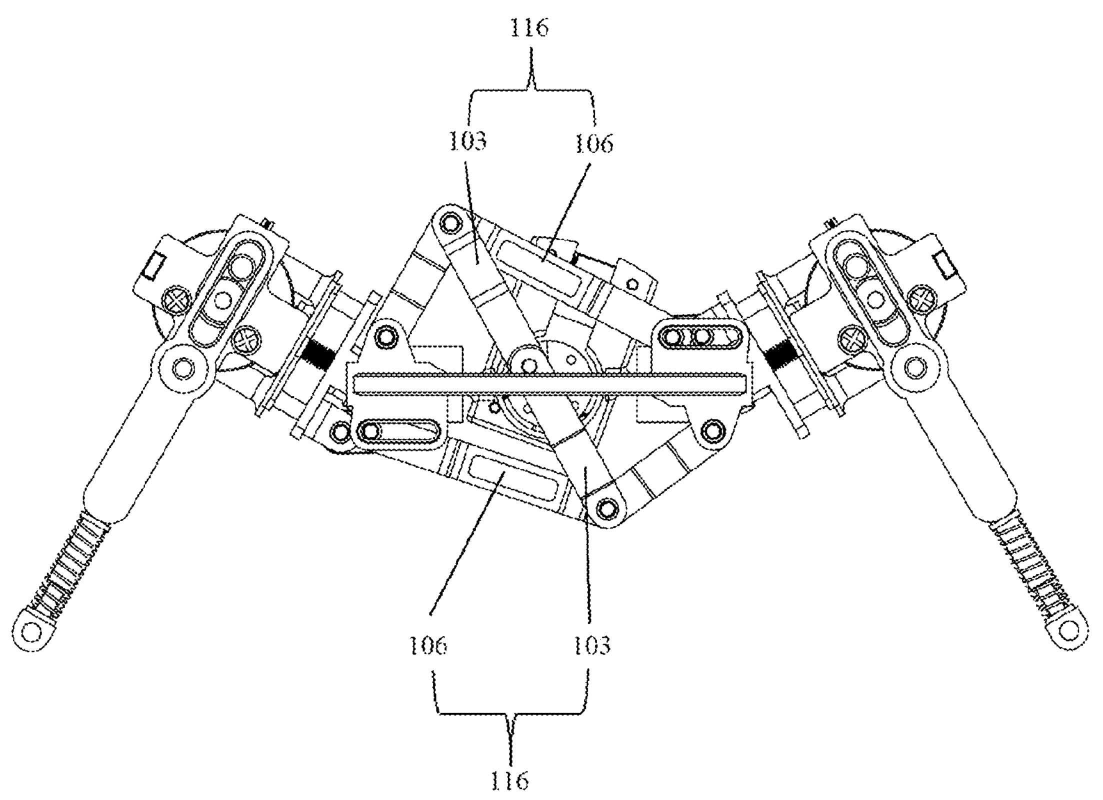
FIG. 2 is a front view of FIG. 1.
Figure 3:
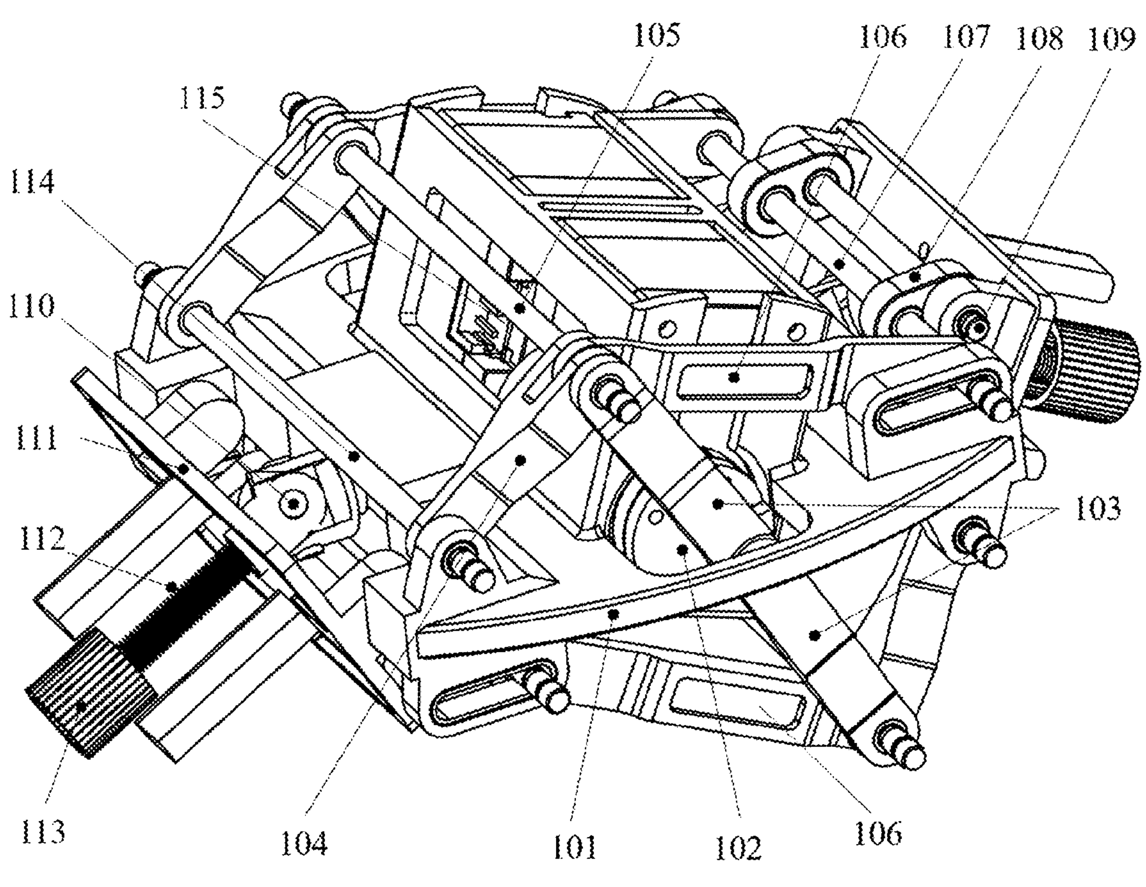
FIG. 3 is a structure schematic diagram of a three-degree-of-freedom active spine.

A quadruped robot is provided in accordance with the present disclosure, as shown in FIG. 1 to FIG. 3, the quadruped robot includes an active spine 1, and two trunks. The two trunks are a fore trunk 2 and a hind trunk 3, respectively. The two trunks can pitch and can be telescopically arranged on both ends of the active spine in a front-back direction, respectively. The active spine can drive the trunks to pitch, extend and retract.

The active spine 1 includes a spine mounting frame 101, two swing output members 111 and a pitching drive motor 115. The two swing output members 111 can be mounted on a front end and a rear end of the spine mounting frame 101 in a pitching manner. The trunks are movably arranged on the swing output members 111 in directions away from and close to the swing output members 111. The pitching drive motor 115 is fixedly arranged in the spine mounting frame 101 to drive the swing output members 111 to pitch. The swing output members 111 can drive the trunks to pitch.

Specifically, in order to achieve the pitching of the swing output member 111, a middle part of the swing output member 111 is hinged to the spine mounting frame 101 to form a fixed revolving pair. A sliding chute is provided on the spine mounting frame 101, and the swing output member 111 forms a movable revolving pair with the sliding chute through a sliding shaft 107. The swing output member 111 reaches a limit pitching angle when the sliding shaft 107 is moved to an end part of the sliding chute. The swing output member 111 can drive the trunk to pitch with respect to the spine mounting frame 101. The active spine 1 includes a pitching drive motor 115, and the pitching drive motor 115 is fixed to the middle part of the spine mounting frame 101. The pitching drive motor 115 can drive the sliding shaft 107 to move in the sliding chute through a multi-link mechanism so as to achieve the pitching of the swing output member 111. A spine drive wheel 102 is fixedly arranged on an output shaft of the pitching drive motor 115, a mounting part is eccentrically arranged on the spine drive wheel 102. The pitching drive motor 115 is used to drive the two swing output members 111 to pitch through a first multi-link mechanism and a second multi-link mechanism, respectively. One end of the first multi-link mechanism and one end of the second multi-link mechanism are fixedly connected to the mounting parts, and the other ends of the first multi-link mechanism and the second multi-link mechanism are respectively hinged to the two sliding shafts 107. The first multi-link mechanism and the second multi-link mechanism are symmetrical about a point center. The multi-link mechanism is a two-link mechanism 116, two links in the two-link mechanism 116 are connected by a three-rod connecting shaft 105, and a crank rod 104 is hinged on the three-rod connecting shaft 105, and one end, far away from the three-rod connecting shaft 105, of the crank rod 104 is hinged with the spine mounting frame 101. Two-link mechanism 116 includes a drive rod 103 and a link 106. A first end of the drive rod 103 is fixedly connected to the mounting part on the spine drive wheel 102, and a second end of the drive rod 103 is connected to a first end of the crank rod 104 and a first end of the link 106 through the three-rod connecting shaft 105 to form a movable revolving pair, and the drive rod 103, the crank rod 104 and the link 106 can rotate relatively around the three-rod connecting shaft 105. A second end of the crank rod 104 is connected to the spine mounting frame 101 through a crank rod shaft 114 to form a fixed-axis revolving pair. A second end of the link 106 is connected to the sliding shaft 107 to form a movable revolving pair. The sliding shaft 107 moves linearly in a sliding chute provided at a tail end of the spine mounting frame 101. A first end of a short rod 108 is connected to the sliding shaft 107 to form a movable revolving pair, and a second end of the short rod 108 is connected to a first end of the swing output member 111 through a short rod shaft 109 to form a movable revolving pair. A second end of the swing output member 111 forms a fixed revolving pair with the spine mounting frame 101, and the axis of the revolving pair formed by the swing output member 111 and the spine mounting frame 101 is in a central plane of the spine mounting frame 101.

Figure 4:
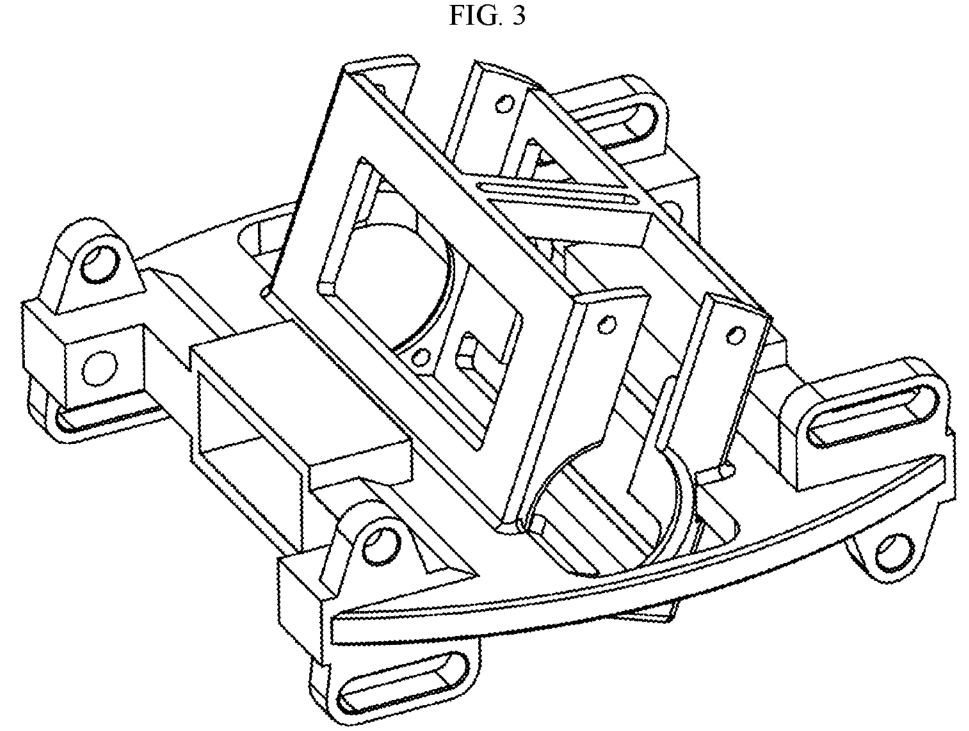
FIG. 4 is a structure schematic diagram of a spine mounting frame.
Figure 5:
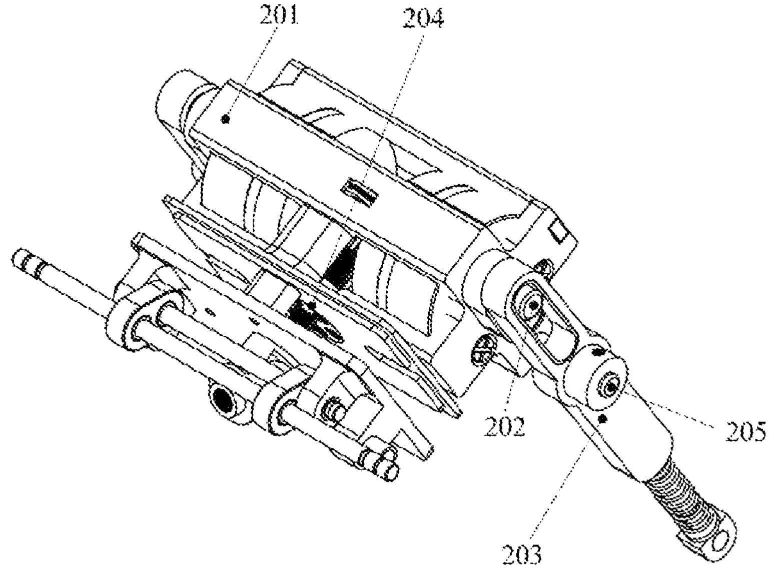
FIG. 5 is a structure schematic diagram of a hind trunk.
Figure 6:
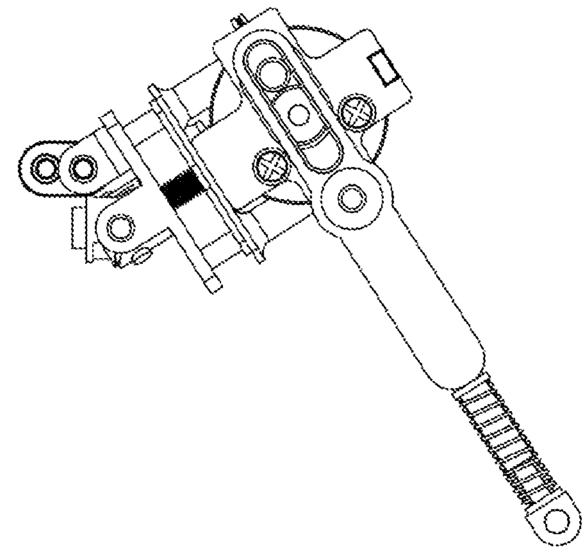
FIG. 6 is a front view of FIG. 5.

As shown in FIG. 3 and FIG. 4, link systems on the upper and lower sides of the whole spine mounting frame 101 are arranged symmetrically about the center. By optimizing the rod length, the swing output members 111 on both sides can output symmetrical rotating angles along with unidirectional rotations of the spine drive wheels 102, thus achieving complex reciprocating swing with a simple driving structure.

The two trunks are telescopically arranged on the two swing output members 111, respectively. The active spine 1 can drive the trunks to expand and retract towards the directions away from and close to the swing output members 111. Specifically, the active spine 1 also includes two extension and retraction drive motors, which correspond to the two trunks, respectively. The extension and retraction drive motor is fixedly arranged on the swing output member 111 or an end part of the spine mounting frame 101, and the trunk is connected to the swing output member 111 in a sliding manner. The trunk is provided with a threaded hole, a lead screw 112 is connected to an output shaft of the extension and retraction drive motor, and the lead screw 112 is threaded to the threaded hole. The extension and retraction drive motor drives the lead screw 112 to rotate in different directions to achieve the expansion and retraction of the trunk. The threaded hole is formed by an inner hole of a lead screw nut 204 fixedly arranged on the trunk mounting frame 201.

When the extension and retraction drive motor is fixedly arranged at the end part of the spine mounting frame 101, an output shaft of the extension and retraction drive motor is in transmission connection with the lead screw 112 through a universal joint 110, and the lead screw 112 passes through a circular hole provided in the center of the swing output member 111.

A structure of the spine mounting frame 101 is planar symmetrical about a first plane, which is a central plane in a width direction of the spine mounting frame 101. That is, transmission systems are arranged on both sides of the spine mounting frame 101 in the width direction for smooth transmission, and the width direction of the spine mounting frame is perpendicular to a moving direction of the quadruped robot.

The spine of the quadruped robot provided by this embodiment can pitch, extend and retract, so as to simulate the running posture of a quadruped more realistically, and further improve the moving speed and energy efficiency.

In some embodiments, the pitch drive motor is a double-shaft drive motor arranged at the center of the spine mounting frame 101, and output shafts on both sides are fixedly connected to the spine drive wheels 102 on both sides, respectively, thereby outputting torque synchronously.

In some embodiments, as shown in FIG. 5 to FIG. 10, multiple elastic legs 203, preferably two, are arranged below each trunk. The active spine 1 includes an elastic leg retraction drive device, which includes pull cords, a winding reel 113, and a lead screw 112. Two pull cords are wound around the winding reel 113, namely a left pull cord 213 and a right pull cord 212, and the two pull cords correspond to the two elastic legs 203. A free end of the pull cord is fixedly connected to a tail end of the elastic leg 203, and the winding reel 113 is coaxially mounted at a tail end of the lead screw 112. When the lead screw 112 is driven by the extension and retraction drive motor to rotate, the winding reel 113 is driven to rotate forward and backward, and a guide pulley 207 is arranged on the trunk to guide the pull cord. When a drive motor of the winding reel 113 drives the pull cord to be wound around the winding reel 113, the elastic leg 203 can be compressed for energy storage, and when the driving motor of the winding reel 113 rotates reversely, the energy of the elastic leg 203 can be released to achieve bounce.

Figure 11:
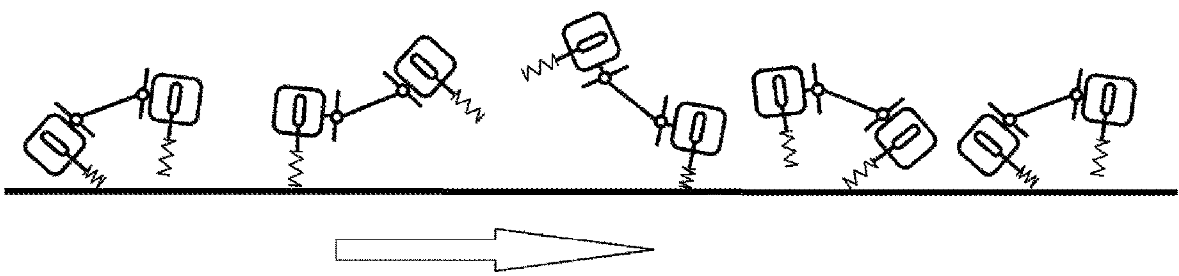
FIG. 11 shows an action state of a spine and a leg in a gait cycle.

The winding reel 113 in the quadruped robot provided in this embodiment is controlled by the lead screw 112 to wind and unwind. As shown in FIG. 11, when the fore trunk 2 is in a retracted state, the elastic leg 203 is in a released state, and when the fore trunk 2 is in an extended state, the elastic leg 203 is in a compressed energy storage state. When the hind trunk 3 is in a retracted state, the elastic leg 203 is in a compressed energy storage state, and when the hind trunk 3 is in an extended state, the elastic leg 203 is in a released state. Spine movement and leg-foot movement are related to their original independent movements with limited drive to produce movement superposition effect, which solves the problems of stiff walking and running, slow moving speed and low energy efficiency caused by a stiff trunk of a traditional quadruped robot.

In other embodiments, a separate motor may also be used to drive the winding reel 113 to wind and unwind.

Figure 7:
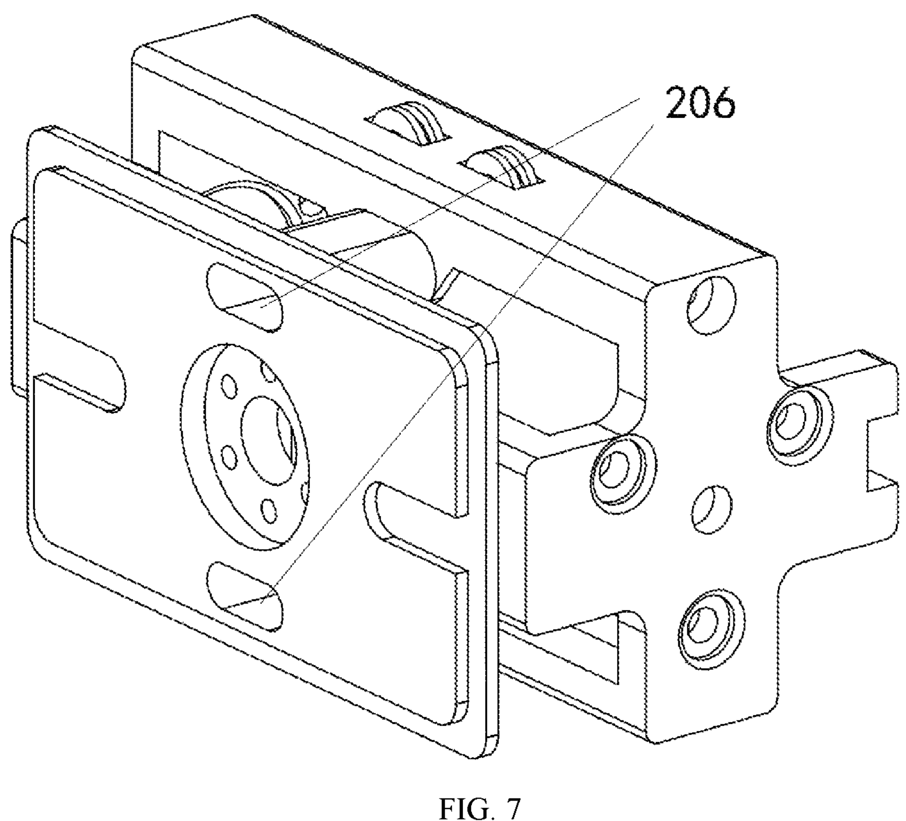
FIG. 7 is a structure schematic diagram of a trunk mounting frame.
Figure 8:
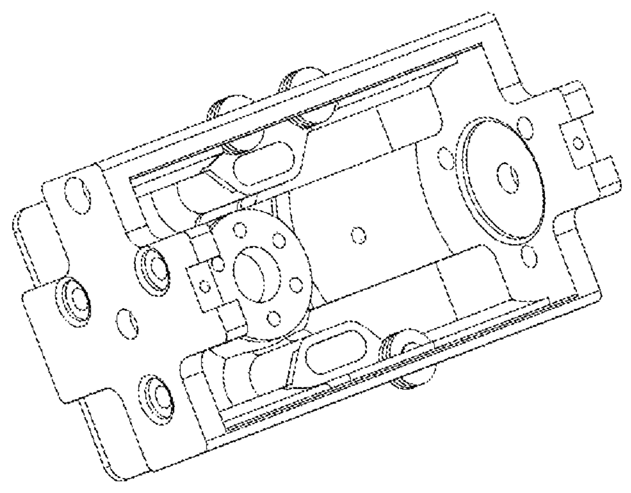
FIG. 8 is a view of FIG. 7 in another direction.
Figure 9:
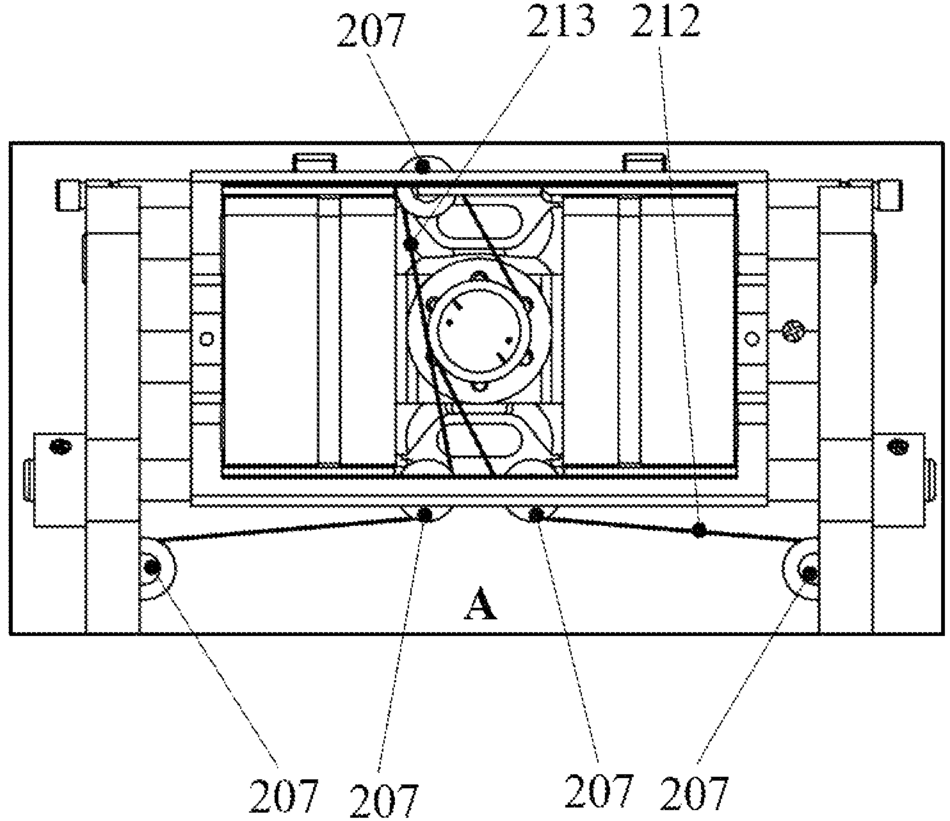
FIG. 9 is a structure schematic diagram illustrating the layout of a pull cord and a pulley.
Figure 10:
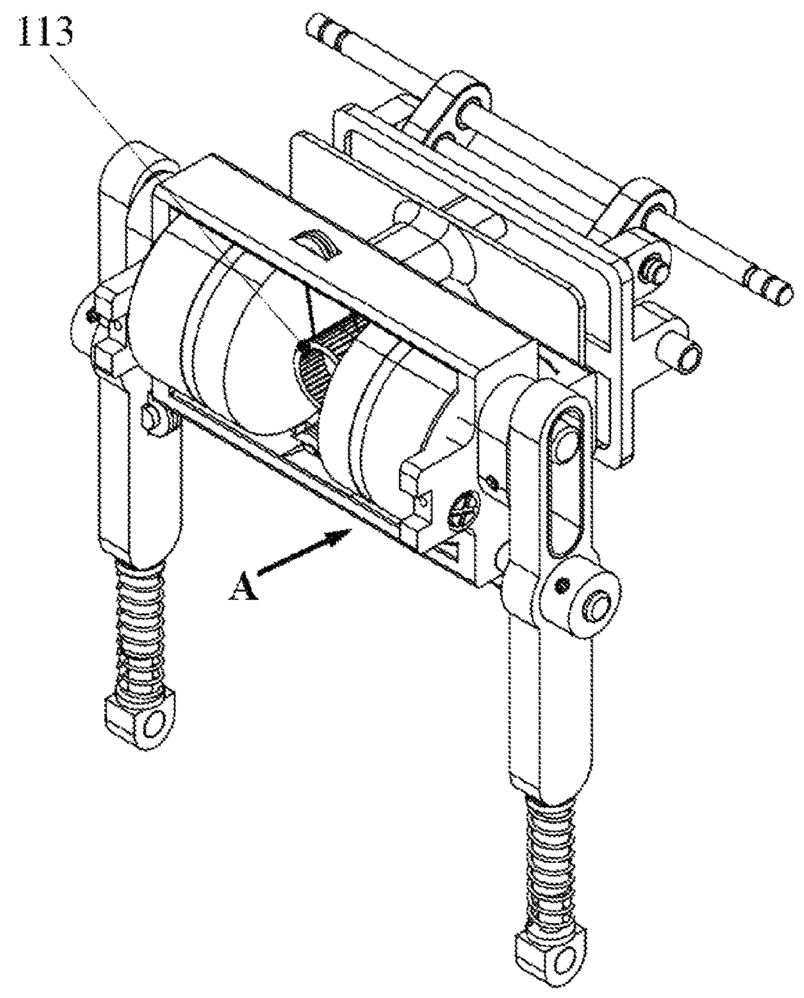
FIG. 10 is a schematic diagram of a mounting structure of an elastic leg.

Preferably, the trunk includes a trunk mounting frame 201, two elastic leg swing drive motors, two drive cranks 202, and two elastic leg rotating shafts 205, and the trunk mounting frame 201 is as shown in FIG. 7 and FIG. 8. Two slideways 206 are provided on the trunk mounting frame 201, and two columnar sliding columns are arranged on the swing output member 111. The sliding column forms a moving pair with the slideway 206. The two elastic leg swing drive motors are arranged on both sides inside the trunk mounting frame 201. A working space for the winding reel 113 is reserved between the two elastic leg swing drive motors. The elastic leg rotating shaft 205 is fixedly mounted on the lower side of the trunk mounting frame 201, the elastic leg 203 is rotatably connected to the elastic leg rotating shaft 205, an output shaft of the elastic leg swing drive motor is fixedly connected to a first end of the drive crank 202, a cylinder protruding from a second end of the drive crank 202 forms a moving rotating pair with the sliding chute on the upper side of the elastic leg 203, and the drive crank 202 rotates unidirectionally to make the elastic leg 203 periodically reciprocate around the elastic leg rotating shaft 205.

In accordance with this embodiment, the independent swing of the elastic leg 203 can be achieved to simulate the swing of the leg when a quadruped jumps.

Embodiment 2

A spine-leg-foot coupling driving method of the quadruped robot above is further provided in accordance with embodiment 1. The method includes the following steps:

Multiple elastic legs 203 are arranged below each trunk of the quadruped robot. The drive device includes an elastic retraction drive device, which can drive the elastic legs 203 to compress for energy storage, and can terminate a compressed state to enable the elastic legs 203 to bounce.

Pitch and retraction states of a spine and an energy storage and release state of legs during the running of a quadruped are simulated by controlling a swing state of a swing output member 111, an extension and retraction state of the trunk and an energy storage and release state of the elastic leg 203.

Specifically, when the spine drive wheels 102 rotate unidirectionally, the swing output members 111 on both sides drive the fore trunk 2 and the hind trunk 3 to make periodic symmetrical swing, which simulates the dynamic pitching of the spine when an animal runs. Motors located on both sides of the spine mounting frame can independently an output torque to the universal joints 110 and then drive the lead screws 112 to realize the displacement of the fore trunk 2 and the hind trunk 3 with respect to the swing output members 111, which simulates the dynamic retraction and extension of the spine when the animal runs. When the robot runs in a jumping gait, the elastic legs 203 of the fore trunk 2 are kept in phase, and the elastic legs 203 of the hind trunk 3 are kept in phase. The fore trunk 2 and the hind trunk 3 touch the ground one after another in a gait cycle, and the action state of the spine and the legs in a gait cycle is shown in FIG. 11.

In FIG. 11, a state 1, a state 2, a state 3 and a state 4 are in turn from left to right.

In the state 1, swing angles of the swing output members 111 are controlled to make the elastic legs 203 gathered inwards, and the fore trunk 2 and the hind trunk 3 are retracted to close to the spine side. At the moment, the elastic legs 203 of the fore trunk 2 are in a released state and the elastic legs 203 of the hind trunk 3 are in a compressed state.

In the state 2, swing angles of the swing output members 111 are controlled to make the elastic legs 203 expand outward, and the fore trunk 2 is retracted at the spine side. The lead screw 112 in the hind trunk 3 rotates to make the hind trunk 3 displace with respect to the spine mounting frame, thus making the pull cords of the elastic legs 203 of the hind trunk 3 to separate away from the winding reel 113. The elastic legs 203 of the hind trunk 3 are converted from a compressed state to a release state and are superimposed with displacement of the hind trunk 3 by the lead screw to produce a pedaling effect, thus the robot jumps forwards, and at the moment, the elastic legs 203 of the front trunk 2 are in a released state.

In the state 3, a flight stage of the robot is terminated, and the fore trunk 2 begins to touch the ground. The lead screw 112 in the fore trunk 2 rotates to make the fore trunk 2 close to the spine side while causing the pull cords of the elastic legs 203 of the fore trunk 2 to be wound around the winding reel 113. The elastic legs 203 of the fore trunk 2 are converted from a released state to a compressed state. At the moment, the elastic legs 203 of the hind trunk 3 are in a released state.

In the state 4, the swing angles of are controlled to make the elastic legs 203 retract inwards. The lead screw 112 in the fore trunk 2 rotates to make the fore trunk 2 and the spine mounting frame generate relative displacement while making the pull cords of the elastic legs 203 of the fore trunk 2 separate from the winding reel 113. The elastic legs 203 of the fore trunk are converted from a released state from a tightened state and is superimposed with the displacement of the fore trunk 2 by the lead screw 112 to produce a pedaling effect, thus the robot jumps forwards, and at the moment, the elastic legs of the rear trunk 3 are in a released. Therefore, a gait cycle is completed.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A quadruped robot, comprising an active spine, a fore trunk and a hind trunk; wherein the fore trunk and the hind trunk are able to pitch and to be telescopically arranged on both ends of the active spine in a front-back direction, and the active spine is able to drive the fore trunk and the hind trunk to pitch, extend and retract, wherein the active spine comprises a spine mounting frame, two swing output members and a pitching drive motor, the two swing output members are able to be mounted on a front end and a rear end of the spine mounting frame in a pitching manner, the fore trunk and the hind trunk are movably arranged on the swing output members in directions away from and close to the swing output members, the pitching drive motor is fixedly arranged in the spine mounting frame and is able to drive the swing output members to pitch, and the swing output members are able to drive the fore trunk and the hind trunk to pitch, wherein a middle part of each of the swing output members is hinged to the spine mounting frame to form a fixed revolving pair; sliding chutes are provided on the spine mounting frame, and the swing output members form movable revolving pairs with the sliding chutes through sliding shafts; the swing output members reach limit pitching angles when the sliding shafts are moved to ends of the sliding chutes, and the pitching drive motor is able to drive the sliding shafts to move in the sliding chutes to achieve the pitching of the swing output members; and wherein the active spine further comprises two extension and retraction drive motors, which respectively correspond to the fore trunk and the hind trunk; the two extension and retraction drive motors are fixedly arranged on the swing output members or both ends of the spine mounting frame; the fore trunk and the hind trunk are provided with threaded holes; lead screws are connected to output shafts of the two extension and retraction drive motors, and the lead screws are threaded to the threaded holes, thus the two extension and retraction drive motors are used to drive the lead screws to rotate towards different directions to extend and retract the fore trunk and the hind trunk;

in a case that the two extension and retraction drive motors are fixedly arranged on the both ends of the spine mounting frame, the output shafts of the two extension and retraction drive motors are in transmission connection with the lead screws through universal joints.

2. The quadruped robot according to claim 1, wherein a spine drive wheel is fixedly arranged on an output shaft of the pitching drive motor, a mounting part is eccentrically arranged on the spine drive wheel, and the pitching drive motor is used to drive the two swing output members to pitch through a first multi-link mechanism and a second multi-link mechanism; one end of the first multi-link mechanism and one end of the second multi-link mechanism are both fixedly connected to the mounting part, and an other end of the first multi-link mechanism and an other end of the second multi-link mechanism are respectively hinged to the sliding shafts; the first multi-link mechanism and the second multi-link mechanism are symmetrical about a point center, the pitching drive motor drives the spine drive wheel to rotate unidirectionally to achieve reciprocating swing of the swing output members, the first multi-link mechanism and the second multi-link mechanism each are a two-link mechanism, two links in the two-link mechanism are connected by a three-rod connecting shaft, a crank rod is also hinged on the three-rod connecting shaft, and one end of the crank rod away from the three-rod connecting shaft is hinged with the spine mounting frame.

3. The quadruped robot according to claim 2, wherein a structure of the spine mounting frame is planar symmetrical about a first plane, the first plane is a central plane in a width direction of the spine mounting frame; and the pitching drive motor is a double-shaft drive motor, which is mounted in the middle of the spine mounting frame, and two output shafts of the pitching drive motor are fixedly connected to spine drive wheels on both sides of the spine mounting frame.

4. The quadruped robot according to claim 1, wherein a plurality of elastic legs are arranged below each of the fore trunk and the hind trunk, and the active spine comprises elastic leg retraction drive devices, which are able to drive the elastic legs to compress for energy storage, and are able to terminate a compressed state to enable the elastic legs to bounce.

5. The quadruped robot according to claim 4, wherein the plurality of elastic legs comprises two elastic legs, each of the elastic leg retraction drive devices comprises two pull ropes, a winding reel and a corresponding one of the lead screws; the two pull ropes are wound around the winding reel and correspond to the two elastic legs; free ends of the two pull ropes are fixedly connected to tail ends of the two elastic legs; the winding reel is coaxially mounted at a tail end of the corresponding one of the lead screws; when the two extension and retraction drive motors drive the lead screws to rotate, the winding reel is driven to rotate forward and backward; guide pulleys are arranged on each of the fore trunk and the hind trunk to guide the two pull ropes.

6. The quadruped robot according to claim 4, wherein the plurality of elastic legs comprises two elastic legs, each of the fore trunk and the hind trunk comprises a trunk mounting frame, two elastic leg swing drive motors, two drive cranks and two elastic leg rotating shafts, two slideways are provided on the trunk mounting frame, and two columnar sliding columns are arranged on each of the swing output members; the two sliding columns form moving pairs with the two slideways; the two elastic leg swing drive motors are arranged on both sides inside the trunk mounting frame; a working space for the winding reel is reserved between the two elastic leg swing drive motors, the two elastic leg rotating shafts are fixedly mounted on a lower side of the trunk mounting frame, the two elastic legs are rotatably connected to the two elastic leg rotating shafts, output shafts of the two elastic leg swing drive motors are fixedly connected to first ends of the two drive cranks, cylinders protruding from second ends of the two drive cranks form moving revolving pairs with additional sliding chutes on upper sides of the two elastic legs, and the two drive cranks rotate unidirectionally to enable the two elastic legs periodically reciprocate around the two elastic leg rotating shafts.

7. A spine-leg-foot coupling driving method of the quadruped robot according to claim 1, comprising:

providing a plurality of elastic legs below each of the fore trunk and the hind trunk of the quadruped robot, wherein the active spine comprises elastic leg retraction drive devices, which are able to drive the elastic legs to compress for energy storage, and are able to terminate a compressed state to enable the elastic legs to bounce; and simulating pitch and retraction states of a spine and an energy storage and release state of legs during the running of a quadruped by controlling swing states of the swing output members, extension and retraction states of the fore trunk and the hind trunk and energy storage and release states of the elastic legs.

8. The spine-leg-foot coupling driving method according to claim 7, wherein a spine drive wheel is fixedly arranged on an output shaft of the pitching drive motor, a mounting part is eccentrically arranged on the spine drive wheel, and the pitching drive motor is used to drive the two swing output members to pitch through a first multi-link mechanism and a second multi-link mechanism; one end of the first multi-link mechanism and one end of the second multi-link mechanism are both fixedly connected to the mounting part, and an other end of the first multi-link mechanism and an other end of the second multi-link mechanism are respectively hinged to the sliding shafts; the first multi-link mechanism and the second multi-link mechanism are symmetrical about a point center, the pitching drive motor drives the spine drive wheel to rotate unidirectionally to achieve reciprocating swing of the swing output members, the first multi-link mechanism and the second multi-link mechanism each are a two-link mechanism, two links in the two-link mechanism are connected by a three-rod connecting shaft, a crank rod is also hinged on the three-rod connecting shaft, and one end of the crank rod away from the three-rod connecting shaft is hinged with the spine mounting frame.

9. The spine-leg-foot coupling driving method according to claim 8, wherein a structure of the spine mounting frame is planar symmetrical about a first plane, the first plane is a central plane in a width direction of the spine mounting frame; and the pitching drive motor is a double-shaft drive motor, which is mounted in the middle of the spine mounting frame, and two output shafts of the pitching drive motor are fixedly connected to spine drive wheels on both sides of the spine mounting frame.

10. The spine-leg-foot coupling driving method according to claim 7, wherein the plurality of elastic legs comprises two elastic legs, each of the elastic leg retraction drive devices comprises two pull ropes, a winding reel and a corresponding one of the lead screws; the two pull ropes are wound around the winding reel and correspond to the two elastic legs; free ends of the two pull ropes are fixedly connected to tail ends of the two elastic legs; the winding reel is coaxially mounted at a tail end of the corresponding one of the lead screws; when the two extension and retraction drive motors drive the lead screws to rotate, the winding reel is driven to rotate forward and backward; guide pulleys are arranged on each of the fore trunk and the hind trunk to guide the two pull rope.

11. The spine-leg-foot coupling driving method according to claim 7, the plurality of elastic legs comprises two elastic legs, each of the fore trunk and the hind trunk comprises a trunk mounting frame, two elastic leg swing drive motors, two drive cranks and two elastic leg rotating shafts, two slideways are provided on the trunk mounting frame, and two columnar sliding columns are arranged on each of the swing output members; the two sliding columns form moving pairs with the two slideways; the two elastic leg swing drive motors are arranged on both sides inside the trunk mounting frame; a working space for the winding reel is reserved between the two elastic leg swing drive motors, the two elastic leg rotating shafts are fixedly mounted on a lower side of the trunk mounting frame, the two elastic legs are rotatably connected to the two elastic leg rotating shafts, output shafts of the two elastic leg swing drive motors are fixedly connected to first ends of the two drive cranks, cylinders protruding from second ends of the two drive cranks form moving revolving pairs with additional sliding chutes on upper sides of the two elastic legs, and the two drive cranks rotate unidirectionally to enable the two elastic legs periodically reciprocate around the two elastic leg rotating shafts.

* * * * *